UNITED STATES PATENT OFFICE.

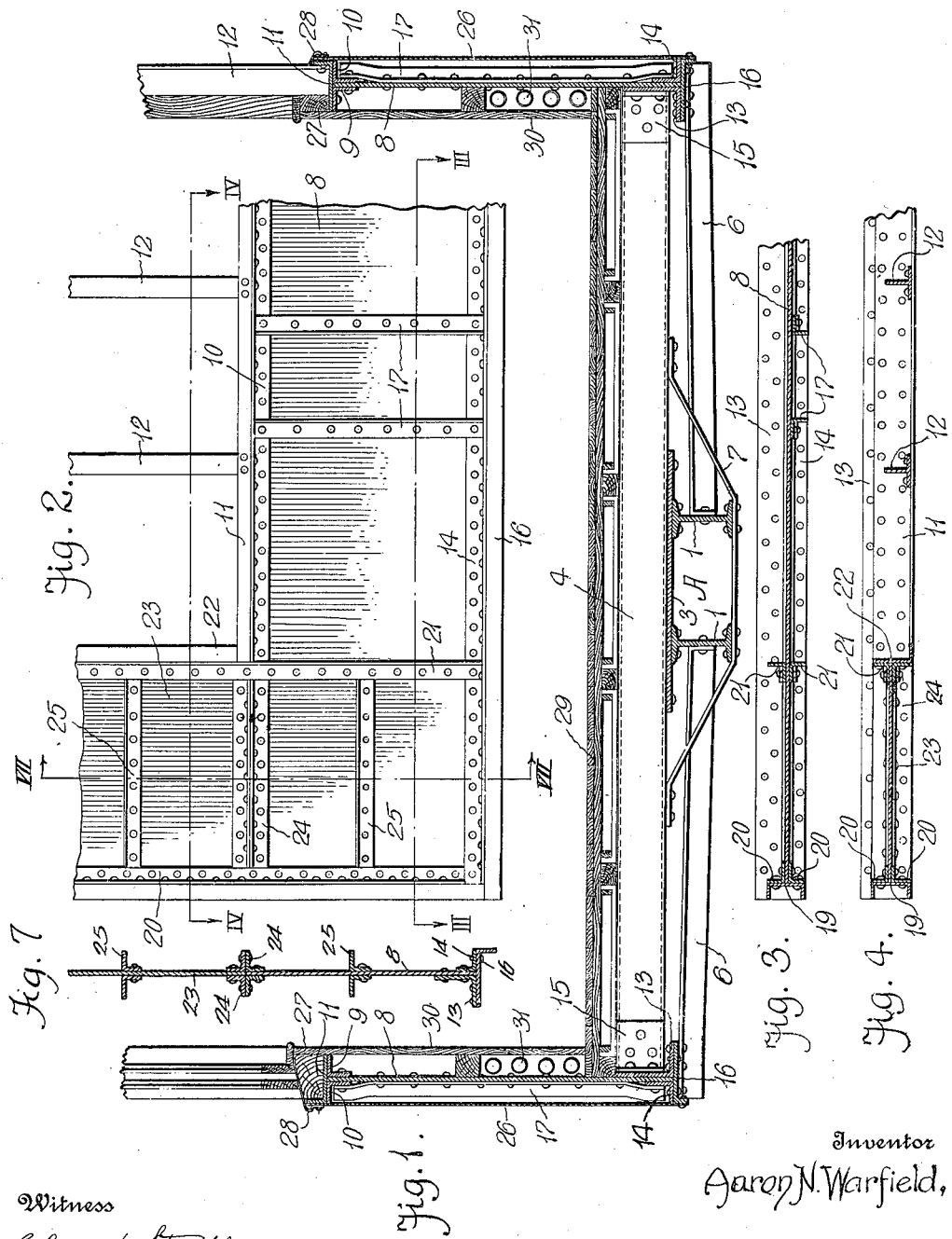

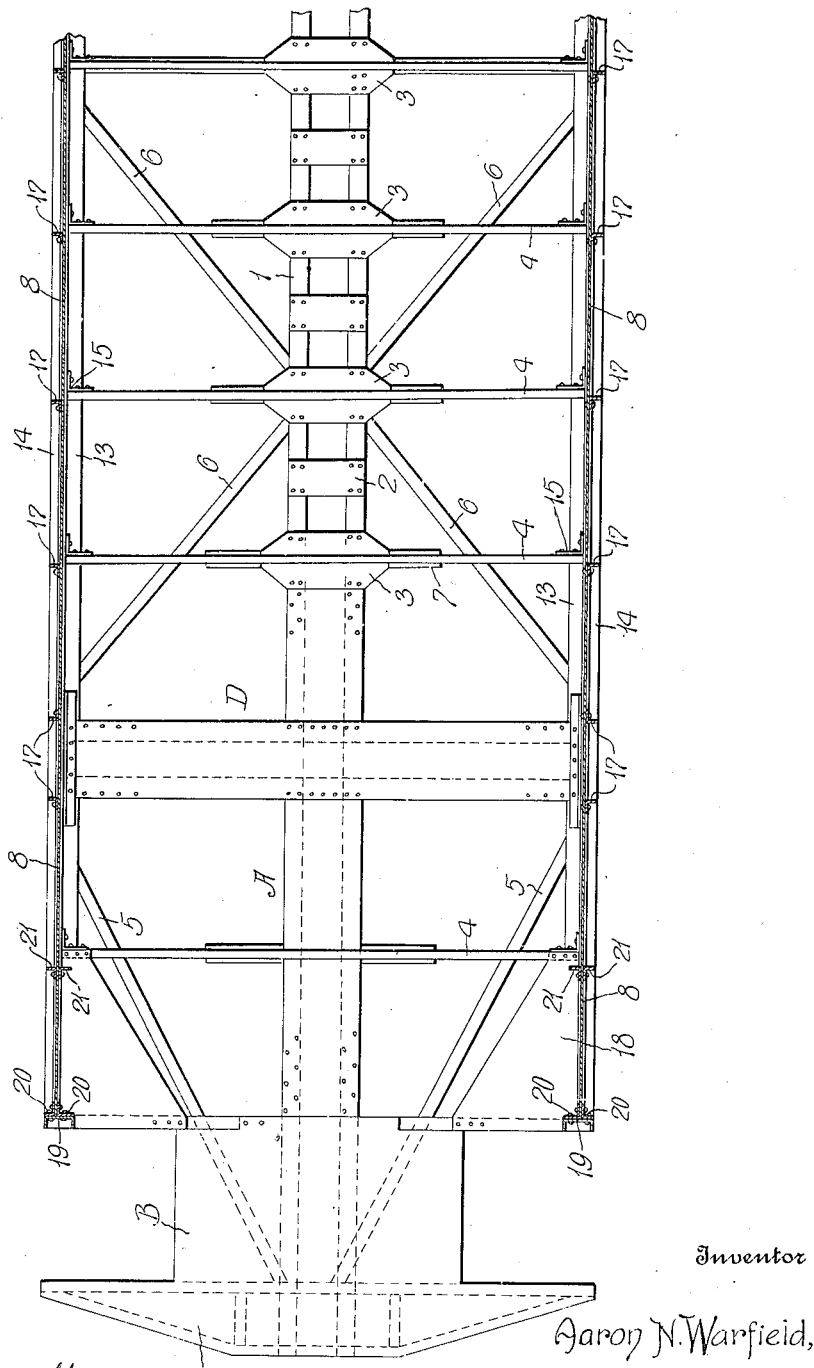

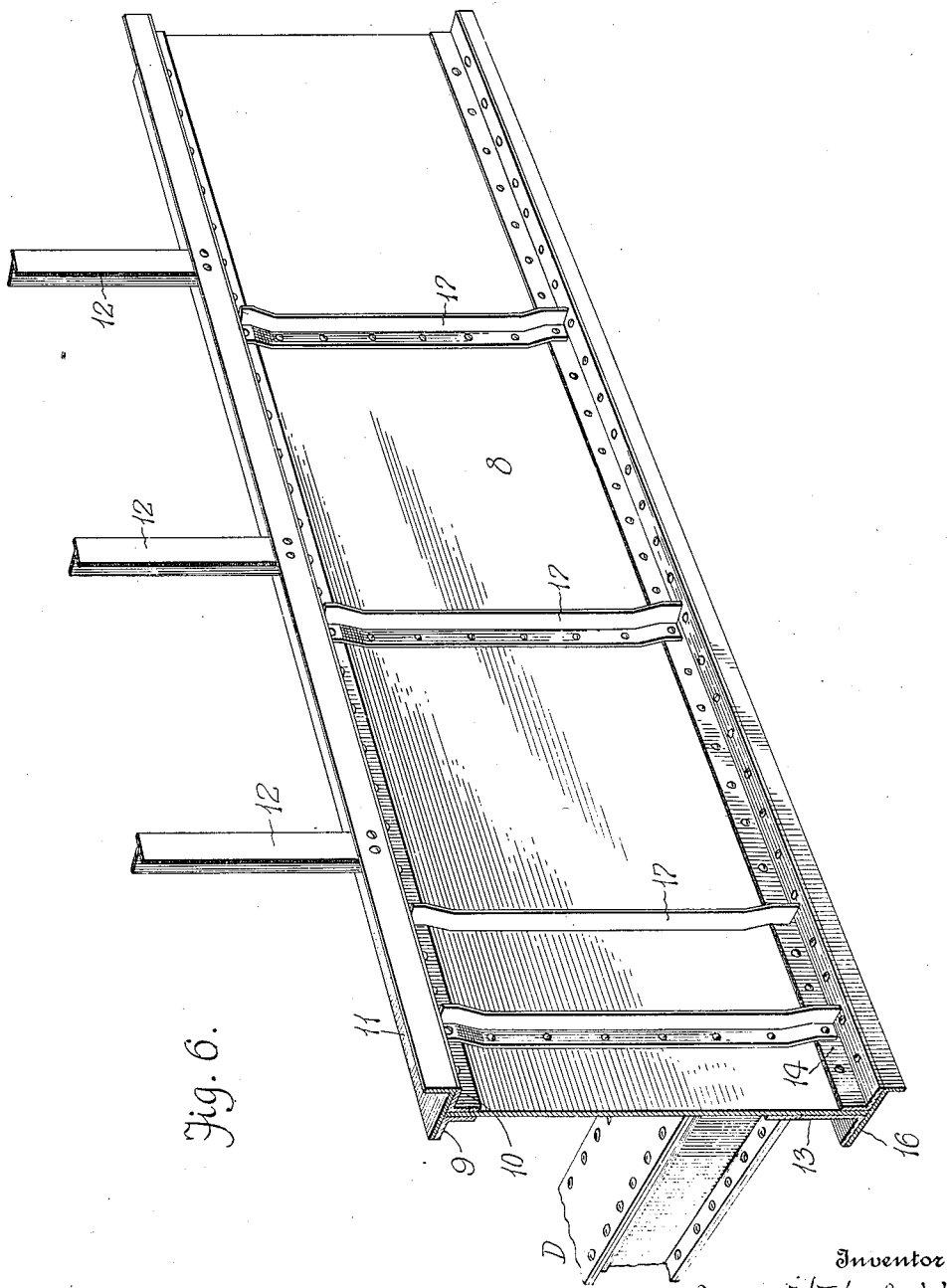

AARON N. WARFIELD, OF LONDON, ONTARIO, CANADA.

CAR CONSTRUCTION.

1,272,741. Specification of Letters Patent. Patented July 16, 1918.

Application filed October 23, 1916. Serial No. 127,059.

*To all whom it may concern:*

Be it known that I, AARON N. WARFIELD, a citizen of the United States of America, residing at London, in the county of Middlesex, Province of Ontario, Canada, have invented certain new and useful Improvements in Car Construction, of which the following is a specification, reference being had therein to the accompanying drawings.

This invention relates to car construction, and more particularly to the construction of passenger cars for railway service.

My invention aims to provide metallic car bodies, in which common commercial shapes may be employed for the most part at least, thereby avoiding the greater cost incident to the use of specially rolled shapes. By using common commercial shapes of structural steel, the passenger cars of different railroad lines may be standardized to that extent that one railroad may repair the cars of another railroad, insomuch that common commercial shapes may be easily obtained thus facilitating repairs and increasing the number of usable cars.

My invention further aims to provide a metallic car construction which is simple, yet utilizing the elements thereof to such advantage as to give greater strength and rigidity without undue weight. This is accomplished by simplifying the side wall construction of the car without sacrificing strength and rigidly so essential in long and heavy passenger coaches. The side wall construction of a car may be characterized by novel uninterrupted side plate girders which extend throughout the length of the car and are so braced relative to the floor construction as to withstand considerable end thrust without buckling.

The side wall construction of a car is further characterized by window stanchions or posts which do not intersect the side plate girders of the car, thus not interfering with the rigidity of said girders, and which afford ample means of support for interior and exterior finishing elements of the car.

My invention is further characterized by a novel floor construction adapted to coöperate with the side wall construction in precluding a car telescoping another in collision, thus providing for railroad purposes a structural framework which will maintain car lines and further insure safety of the occupants of a car in accordance with my invention.

My invention further aims to accomplish the above results by a mechanical construction wherein the parts are assembled with a view of reducing the cost of manufacture and at the same time retain the features by which durability and ease of repair work are secured. With such ends in view, my invention resides in the novel construction, combination and arrangement of parts to be hereinafter specifically described and then claimed.

Reference will now be had to the drawing, wherein—

Figure 1 is a cross sectional view of a portion of the car body in accordance with my invention;

Fig. 2 is a side elevation of a portion of one end thereof;

Fig. 3 is a horizontal sectional view taken on the line III—III of Fig. 2;

Fig. 4 is a similar view taken on the line IV—IV of Fig. 2;

Fig. 5 is a horizontal sectional view of a portion of a car body showing the floor framing construction thereof, Fig. 6 is a perspective view of a portion of a side plate girder adapted to form part of the wall construction of a car body, and Fig. 7 is a vertical sectional view taken on the line II—II of Fig. 2.

In describing my invention by aid of the views above referred to, I desire to point out that the same are intended as merely illustrative of an example by which my invention may be put into practice, and I do not care to confine myself to the precise construction and arrangement of parts shown. The following description is therefore to be broadly construed as including such substitute constructions and arrangements of parts which are the obvious equivalent of those to be hereinafter referred to.

In the drawings, A generally denotes a central longitudinal girder of a greater length than the car body proper to afford support for a platform B and a buffer framework C. The girder A, as best shown in Figs. 1 and 5, is composed of parallel I-beams 1 and mounted upon the upper flanges of said I-beams are connecting plates 2 and bearing plates 3, the latter supporting transverse channel beams 4.

Contiguous to the ends of the girder A are fabricated bolsters D and converging from the outer ends of the bolsters D to the outer ends of the girder A are angularly disposed braces 5. Similar braces 6 are connected to the sides of the girder A and the outer ends of said braces are connected to side plate girders, to be hereinafter referred to.

At intervals throughout the girder A, the channel beams 4 have straps 7 extending under the girder and connected to the lower flanges of the I-beams 1.

Reference will now be had to Fig. 6, showing a portion of a side plate girder, which is composed of a plate 8 corresponding in length to the car body. Connected to the upper edge of the plate 8 are longitudinally disposed inner and outer angle bars 9 and 10 respectively, said angle bars having the upper flanges thereof flush with the upper edge of the plate 8, so as to afford support for a longitudinally disposed sill member 11 to which is connected window stanchions or posts 12. These window stanchions or posts 12 are preferably in the form of T-bars resting upon the sill members 11 and providing sufficient support for a car roof, (not shown).

Connected to the lower edge of the plate 8 are inner and outer angle bars 13 and 14 respectively, the former having a vertical flange of greater depth than the latter in order that the transverse channel beams 4 may be connected thereto by angle plates 15.

Connected to the longitudinal angle bars 13 and 14 is an angle base member 16, and by reference to Fig. 1, it will be observed that the outer ends of the braces 6 are connected to this base member, in order that the braces 5 and 6 may coöperate with the beams in supporting the side plate girders, with the braces 6 serving functionally as tie rods to prevent one of the side plate girders from shifting relative to the other side plate girders, thus maintaining a rigid body frame-work.

At intervals throughout the outer side of the plate 8 are vertical angle bars 17 connected to the plate 8 and to the outer longitudinal angle bars 10 and 14, the angle bars adding rigidity to the plate 8 and coöperating therewith in spacing and bracing the sill member 11 relative to the base member 16.

At the ends of the plate 8 are gusset plates 18 connecting the lower edges of the plates 8 to the end beam 4 adjacent the platform B of the car construction and extending upwardly at the ends of the plate 8 are corner channels 19 connected to the inner and outer sides of the plate 8 by angle bars 20, best shown in Figs. 2, 3 and 4. The inner and outer angle bars 9 and 10 at the upper edge of the plate 8, and also the sill member 11 carried thereby, terminate at panel posts, these posts, as best shown in Figs. 2 and 4 being composed of angle bars 21 arranged in parallelism with the angle bars 20 and extending upwardly from the sides of the plate 8. Associated with the angle bars 21 is another angle bar 22 extending upwardly from the sill member 11. Between the panel posts and the corner channels 19 are panels 23 resting upon the upper edge of the plate 8 and connected thereto by the inner and outer angle bars 24. The panels 23 are provided with transverse angle braces 25 and similar braces are placed upon the inner and outer sides of the plate 8 between the angle bars 20 and 21. This construction affords considerable rigidity at the end of the car body without interrupting the plates 8 entering into the construction of the side girders, and with all of the angle bars and channels bracing the plates 8 throughout their length, it is practically impossible to buckle or distort the same.

Referring again to Fig. 1 it will be observed that the outer flanges of the sill member construction and the base members 16 provide support for sheathing 26 that may be employed as an exterior finish for the car body. The sill member 11 will coöperate with the window stanchions or posts 12 in supporting suitable framework in connection with windows, and by reference to the left hand side of Fig. 1, it will be noted that a window sill 27 is placed upon the sill member 11 and the window sill provided with a liquid shedding member 28 that is fastened to the outer side of the sheathing 26.

Above the transverse channel beams 4 may be placed an ordinary wood floor 29 and the interior finish of the car is further carried out by an inner wall sheathing 30. This inner wall sheathing will be maintained in spaced relation to the inner side of the plate 8, thereby providing clearance for the conduits 31 of a heating apparatus or conduits used in connection with the electrical wiring of a car or train service.

I attach considerable importance to the fact that the side plate girders are connected by transverse uninterrupted channel beams spaced so as to firmly support the side plate girders at the lower edges thereof, said channel beams providing a buffer framework or under-framing that may be set on one or more fixed girders or longitudinal car structures. In other words, the channel beams coöperate with the side plate girders in forming a lower part of the car body that is entirely novel in design irrespective of the remaining car parts. With the side plate girders and floor construction composed principally of common commercial shapes which are assembled in a manner to insure rigidity without undue weight, there is a fabrication that may be used in the bodies of various kinds of vehicles.

What I claim is:—

1. In a wall construction for railway passenger cars, side plate girders throughout the length of a car wall, corner channels at the ends thereof, panel posts in parallelism with said corner channels, and together with said corner channels extending above the upper edge of said girder at the ends thereof, panels between said corner channels and said panel posts, and means connecting said panels to the upper edge of said girder.

2. In a wall construction for railway passenger cars, web plate side girders, each composed of a plate, a sill member of less length than said plate connected to the upper edge thereof, a base member connected to the lower edge of said plate corresponding in length thereto, corner channels at the ends of said plate and extending above the upper edge of said plate, panel posts at the ends of said sill member extending onto both sides of said plate, and panels between said corner channels and said panel posts and connected to the upper edge of said plate.

In testimony whereof I affix my signature in the presence of two witnesses.

AARON N. WARFIELD.

Witnesses:
 JAS. B. McKILLOP,
 JESSIE HARRIS.